United States Patent [19]

Vriens et al.

[11] Patent Number: 4,683,398

[45] Date of Patent: Jul. 28, 1987

[54] PROJECTION TELEVISION DISPLAY TUBE AND DEVICE HAVING INTERFERENCE FILTER

[75] Inventors: Leendert Vriens, Eindhoven, Netherlands; John A. Clark, Carshalton, United Kingdom; Johannes H. M. Spruit, Eindhoven, Netherlands

[73] Assignee: U.S. Philips Corporation, New York, N.Y.

[21] Appl. No.: 794,862

[22] Filed: Nov. 4, 1985

[30] Foreign Application Priority Data

May 29, 1985 [GB] United Kingdom ............... 8513558

[51] Int. Cl.$^4$ ........................................... H01J 29/89
[52] U.S. Cl. ..................................... 313/474; 313/112; 358/237; 358/253
[58] Field of Search ............... 313/474, 461, 112; 358/250, 252, 253, 237

[56] References Cited

U.S. PATENT DOCUMENTS 4,365,183  12/1982  Kloss ............................ 313/474 X

FOREIGN PATENT DOCUMENTS 18666  11/1980  European Pat. Off. ............ 313/474

Primary Examiner—David K. Moore
Assistant Examiner—K. Wieder
Attorney, Agent, or Firm—John C. Fox

[57] ABSTRACT

A projection television display tube comprising in an evacuated envelope a display screen on the convexly curved inside of a display window in the wall of the envelope, which display screen comprises a layer of luminescent material and a multilayer interference filter between said material layer and the display window, the filter comprising a number of layers which are alternately high refractive index (H) and low refractive index (L). The filter is composed of at least 6 layers, each having an optical thickness nd, wherein n is the refractive index of the material of the layer and d is the thickness, which optical thickness is between $0.2\lambda_f$ and $0.3\lambda_f$, wherein $\lambda_f$ is equal to $p \times \lambda$, wherein $\lambda$ is the desired central wavelength which is selected from the spectrum emitted by the luminescent material and p is a number between 1.18 and 1.32.

17 Claims, 9 Drawing Figures

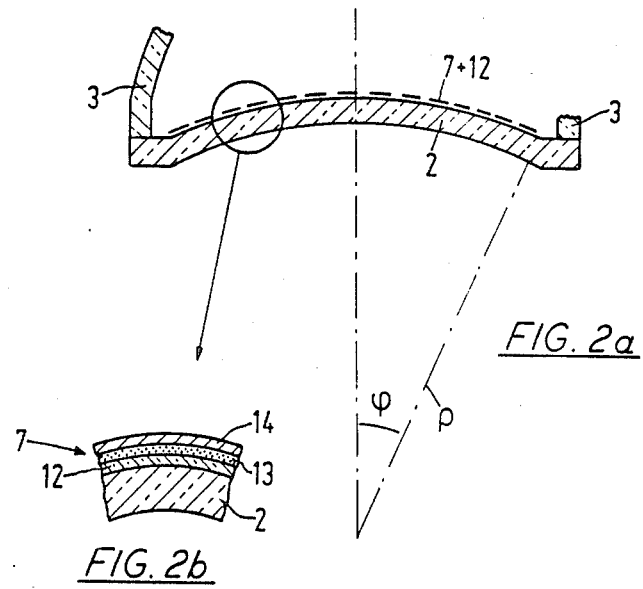
FIG. 2a
FIG. 2b
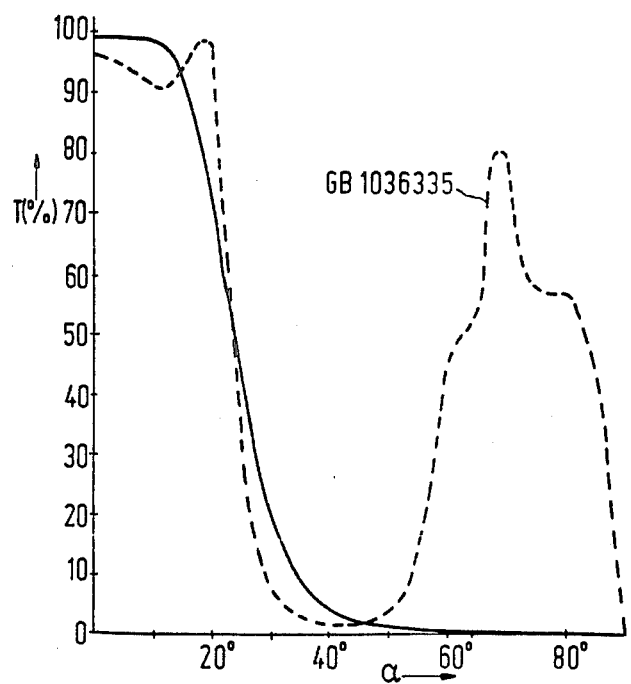
FIG. 5

PROJECTION TELEVISION DISPLAY TUBE AND DEVICE HAVING INTERFERENCE FILTER

BACKGROUND OF THE INVENTION

The invention relates to a projection television display tube comprising in an evacuated envelope a display screen which is provided on the inside of a display tube in the wall of the envelope, said display screen comprising luminescent material and between said material and the display window a multilayer interference filter is provided which comprises a number of layers which are manufactured alternately from a material having a high refractive index and a material having a low refractive index.

From German Patent Application No. 23 30 898, laid open to public inspection, a display tube is known in which a multilayer interference filter is used between the luminescent material (the phosphor) and the display window. For the layers of the filter having a high refractive index, an optical thickness smaller than $0.25\lambda$ or between $0.5$ and $0.75\lambda$ is chosen, wherein $\lambda$ is the wavelength of the light emitted by the luminescent material. For the layers of the filter having a low refractive index, an optical thickness of $0.25\lambda$ is chosen or an odd multiple thereof. The light emission characteristic of the display screen of the tube is varied by the filter in such manner that the quantity of light emitted within a restricted angular aperture increases by 25% compared with a tube without a filter. The contrast in the produced picture is also increased by a reduction of the background brightness.

A similar display tube is disclosed in British Patent Specification No. 1,306,335 in which a so-called passband interference filter is provided between the phosphor and the display screen. This filter consists of layers having an optical thickness of $0.25\lambda$ and appears as follows:
S L H L L L L L L H L H L L L L L L H L H L L L L L L H,
wherein S is the display window, L are layers of a material having a low refractive index, and H are layers of a material having a high refractive index. Such a filter may also be represented as follows:
S L H (L)$^6$ H L H (L)$^6$ H L H (L)$^6$ H.
As a result of the presence of the six layers placed against each other and having a low refractive index (L)$^6$, a Fabry-Perot filter is formed. This filter, with a given choice of the optical layer thickness, has a desired transmission band for light rays which enclose an angle smaller than 25° to 40° to the normal on the filter. In addition, however, there is a non-desired wide transmission band for light rays which enclose an angle between 55° and 90°. All the light which is passed in this band is lost or contributes to so-called halo and hence to loss of contrast in the displayed picture. This will be explained hereinafter. Moreover, the cryolite layers used in said filter are hygroscopic and remain soft so that damage of the filter can easily occur. The zinc sulphide (ZnS) layers used in said filter easily oxidize during firing of the tube (at approximately 460° C.), so that they are not so suitable for use in display tubes.

In the article "Anti-halo Coating For Cathode Ray Tube Face-plates", J. D. Rancourt, Proceedings of the SID, Vol. 25/1, 1984, an 11-layer edge-filter and an 8-layer pass-band-interference filter for suppressing halo effects is described. It is also suggested to use one of these filters for projection T.V. (page 47, right-hand top). An 11-layer filter, however, for projection T.V. still gives much loss because too much light is passed at large angles.

It is therefore an object of the invention to provide a projection television display tube having a multilayer interference filter in which the overall quantity of light produced by the tube within an aperture angle of 20°–35° to the normal for the central wavelength is at least 50–60% larger than in such a tube without a filter.

Another object of the invention is to provide a multilayer interference filter such that for light rays which enclose an angle to the normal on the filter between approximately 30° and 80°–90°, no second transmission band occurs.

A further object of the invention is to provide a projection television display tube having a multilayer interference filter in which it is possible to realize a colour improvement and a greater contrast in the displayed picture as compared with the known tubes.

Still a further object of the invention is to provide a display tube having a multilayer interference filter which can be fired at 440° to 460° C.

SUMMARY OF THE INVENTION

A projection television display tube of the kind described in the opening paragraph is characterized according to the invention in that the display window on the vacuum side is substantially convex having an angle of curvature $\phi$, wherein $\phi$ is the angle between the axis normal to the center of the display screen and a line normal to the part of the display screen farthest remote from the center, and which angle $\phi$ is between 5° and 25°, and the filter is composed of at least 6 layers each having an optical thickness nd, wherein n is the refractive index of the material of the layer and d is the thickness, said optical thickness being between $0.2\lambda_f$ and $0.3\lambda_f$, wherein $\lambda_f$ is equal to p x$\lambda$, wherein $\lambda$ is the desired central wavelength which is selected from the spectrum emitted by the luminescent material and p is an integer between 1.18 and 1.32. The average optical thickness is $0.25\lambda_f$ and $\lambda_f$ is the central wavelength of the filter. On a frequency scale, $1/\lambda_f$ corresponds to the center of the reflection band with perpendicular incidence of the light.

In projection television display tubes a number of problems occur, for example:

(a) The projection of a flat screen display on a flat projection screen requires a very complicated system of lenses. In order to reach a "Hi-Fi" (optical) quality, for example, a five or eight element lens is necessary.

(b) A lumens decline to approximately 20% occurs from the center of the projection screen towards the corners, caused by reduction of the acceptance angles of the lens (including vignetting). This decline in brightness becomes worse as the focal distance of the lens becomes smaller. At the moment there is a clear trend towards smaller focal distances so as to reduce the size of the housing of the projection television device.

(c) Projection television display tubes having green phosphors with Terbium as an activator have an inferior colour rendition due to too great a contribution of orange and red spectral lines.

(d) In tubes with the green Tb phosphor and with the wide band blue ZnS:Ag-phosphor, chromatic aberration occurs.

(e) The brightness on the projection screen generally is on the low side.

(f) The contrast also requires some improvement.

By providing the projection television display tube with both a curved display screen and with a multilayer interference filter, these problems are solved for the greater part. The display quality is improved and at the same time the number of required lens elements in a projection television device is reduced. Less light decline towards the corners also occurs. By using a suitable multilayer optical interference filter between the phosphor and the display screen:

(1) the colour point in the green for the usual Tb phosphor is improved (solution to problem c);
(2) The chromatic aberration, in particular in the green, is reduced (solution to problem d);
(3) The brightness for all central colours is increased (solution to problem e);
(4) The contrast is improved (solution to problem f).

An extra advantage results from the combination of a curved display window having thereon an interference filter between the phosphor and the display window. The light gain in the corners of the display screen has proved to be considerably larger than the sum of the effects of the individual measures, namely the curved display window and the interference filter.

Display tubes having inwardly curved display windows are known from British Patent Specification No. 2,091,898.

The filter in the projection tube according to the invention hence consists exclusively or substantially exclusively of layers having an optical thickness of approximately $0.25\lambda_f$, whereby the filter derives the special property of the very wide reflection band (no transmission) for light rays which enclose an angle between approximately 30° and 80° to 90° to the normal on the filter.

For example, in $0.75\lambda_f$ and $1.25\lambda_f$ filters the width of the reflection band is reduced by factors of 3 and 5, respectively, and undesired transmission occurs at large angles. As a result, the gain in luminous efficiency with such filters in the forward direction, that is, for light rays which enclose small angles to the normal on the filter, as described in German Patent Application No. 2330898, is restricted to 25%. There is also less gain in contrast. The Fabry-Perot filter according to British Patent Specification No. 1,306,335 comprises three $1.5\lambda$ layers (each consisting of six $0.25\lambda$ layers of a material having a low refractive index) and also has an undesired wide transmission band for light reays which enclose large angles to the normal of the filter.

In the above-mentioned article, "Proceedings of the SID", Vol. 25/1, 1984, filters for halo-suppression have been described. Even absorbing filters are suggested. Due to their small number of layers, said filters are less critical as regards the angle within which the reflection strongly decreases (the acceptation angle). Characteristic of the present invention is that the position of the "edge" of the filter (hence p and $\lambda_f$ in $\lambda_f = p\lambda$) is exactly defined and the acceptation angle is comparatively small. This leads to a great gain in brightness at small angles. As a result, the filter is very sensitive to losses at large angles and therefore filters having many layers ($\geq 14$) are desired.

The layer thicknesses in the filter according to the invention are hence chosen so that, at a desired wavelength, the reflection begins to increase considerably for light rays of a luminescent material which enclose an angle exceeding 18° to 30° to the normal on the filter. The wide reflection band ensures that light rays having angles exceeding 25° to 35° are reflected as much as possible and after scattering in the luminescent material, again have a chance to emanate from the tube within an angle of 18° to 30° to the normal on the filter. As a result, a maximum luminous effeciency in the forward direction occurs. For example, at small angles, the luminous efficiency of the central wavelength $\lambda$ of the phosphor is at least 50% larger than without the use of the filter. Moreover, the wide reflection band ensures a strongly reduced halo effect and a reduced emanation of light at large angles.

The optical thickness nd of the layers of the filter preferably is not equal for all layers but varies between $0.2\lambda_f$ and $0.3\lambda_f$, and preferably between $0.23\lambda_f$ and $0.27\lambda_f$ as will be explained in greater detail. As a result of this variation of the thickness, a flatter transmission characteristic of the filter is obtained. Because the transmission characteristic of the filter is dependent on the wavelength, it is possible by a combination of a phosphor and an adapted filter to improve the colour point of the light rays which pass through the filter within an angle of 20° to 30° to the normal.

The value of the numeral p is between 1.18 and 1.32 dependent on the refractive indices of the layers used and on the width of the selected wavelength range, which will be explained inter alia with reference to the preferred embodiments. For a $TiO_2$—$SiO_2$ filter, $p = \lambda_f/\lambda$ is between 1.21 and 1.32.

A first preferred embodiment of a projection television display tube according to the invention is characterized in that the convex display window is substantially spherical having a radius of curvature between 150 m and 730 mm, for example, for a 127 mm diagonal display screen.

A second preferred embodiment of a projection television display tube according to the invention is characterized in that the filter is composed substantially of 14 to 30 layers.

A third preferred embodiment of a tube according to the invention is characterized in that the said optical thicknesses nd are between $0.23\lambda_f$ and $0.27\lambda_f$.

A fourth preferred embodiment is characterized in that the layers of the filter having a high refractive index consist of titanium oxide ($TiO_2$) or tantalum oxide ($Ta_2O_5$) and the layers having a low refractive index consist of silicon oxide ($SiO_2$) or magnesium fluoride ($MgF_2$). The optimum p values for a $Ta_2O_5$—$SiO_2$ filter are approximately 0.04 to 0.05 lower than for a $TiO_2$—$SiO_2$ filter. In this case the reflection band is less wide. Furthermore, the magnesium fluoride is preferably provided at approximately 300° C. to obtain a sufficiently hard layer.

A fifth preferred embodiment is characterized in that the luminescent material comprises a terbium-activated substantially green-luminescing phosphor, and p is a number between 1.21 and 1.25 for a $TiO_2$—$SiO_2$ filter. Terbium-activated substantially green-luminescing phosphors are, for example, yttrium aluminium garnet-terbium (YAG:Tb), yttrium-silicate-terbium ($Y_2SiO_5$:Tb), lanthanumoxybromide-terbium (LaOBr:Tb), lantanum oxychloride-terbium (LaOCl:Tb), and indium borate-terbium ($InBO_3$:Tb). For all these Tb-activated green phosphors the central wavelength is $\lambda = 545$ nm. By choosing p to be between 1.21 and 1.25, $\lambda_f$ is between 660 and 680 n, and a filter is obtained having a high transmission (exceeding 90%) for light rays which enclose an angle smaller than 20°–30° to the normal on the filter. For light rays which enclose an angle greater than 25° to 35° to the normal on the filter, the transmission rapidly reduces and reflection occurs up to 80°–90°. This filter is particularly suited for these Tb-activated phosphors which have emission lines in the blue, green, orange-red and red. By using the filter a gain of the quantity of light emitted by the tube occurs in the green, a much smaller gain in the blue and a substantially complete reduction in the red, which is favourable for the colour point. All this provides a gain in luminous efficiency, colour improvement (closer to the EBU-standards) and gain in contrast. In an optimum filter the overall gain in luminous efficiency for all colours together in these Tb-activated phosphors is 30–60%. The gain in the green is 60 to 120%. The coordinates x and y in the CIE colour triangle are then 0.26 to 0.30 and 0.60 to 0.64, respectively. Without a filter these coordinates are x=0.33 to 0.36 and y=0.54 to 0.59, respectively. The gain in contrast is approximately a factor 2. For an optical display with lenses, as in the case of projection television, this presents the considerable advantage of much less chromatic aberration (little or no red and proportionally less blue with respect to the green).

A sixth preferred embodiment of a tube according to the invention is characterized in that the luminescent material comprises a terbium-activated blue-luminescing phosphor having $\lambda=490$ nm, and p is a number between 1.21 and 1.25 for a $TiO_2$—$SiO_2$ filter. By doping a small quantity of Tb, a predominantly blue-luminescing phosphor is obtained with $\lambda=490$ nm. By choosing p to be between 1.21 and 1.25, $\lambda_f$ is between 590 nm and 615 nm, and a filter is obtained in which the reflection increases comparatively steeply for light rays which enclose an angle greater than 25°–35° to the normal on the filter. Then there is a gain in contrast of 70 to 100% and a gain in luminous efficiency in the blue of 60–100%. In this case a considerable improvement of the colour point occurs because the green spectral lines are filtered out by the multilayer filter.

A seventh preferred embodiment of a tube in accordance with the invention is characterized in that the luminescent material is europium-activated yttrium oxide ($Y_2O_3$:Eu) having $\lambda=612$ nm, and p is a number between 1.21 and 1.25 for a $TiO_2$—$SiO_2$ filter. As a result of this choice of p between 1.21 and 1.25, $\lambda_f$ is between 740 nm and 765 nm, and the reflection of the filter for light rays which enclose an angle greater than 25° to 35° to the normal on the filter increases considerably. Now there is a gain of 60 to 120% in total luminous efficiency. The gain in contrast is approximately 100%. In this case there is a small colour point improvement. The red components in the spectrum of the generated light are as a matter of fact more strongly intensified than the components of shorter wavelength.

The invention may also be used in wide-band phosphors, for example willemite ($Zn_2SiO_4$:Mn), zinc sulphide-silver (ZnS:Ag) and strontium aluminate-europium ($SrAl_3O_{5.5}$:Eu) with central wavelengths $\lambda$ of 530 nm, 460 nm and 460 nm, respectively. The value of p is now chosen to be between 1.21 and 1.32.

An eighth preferred embodiment of a tube in accordance with the invention is characterized in' that the luminescent material is zinc sulphide-silver (ZnS:Ag), $\lambda=460$ nm and p is a number between 1.24 and 1.32 for a $TiO_2$—$SiO_2$ filter.

As a result of this choice of p between 1.24 and 1.32, $\lambda_f$ is between 570 and 610 nm, and the reflection of the filter for light rays which enclose an angle greater than 25° to 35° to the normal on the filter increases considerably. Now there is a gain of 30 to 80% in the luminous efficiency for wavelengths between approximately 440 and 500 nm. The gain in contrast is 80 to 100%. In this case the longwave (green) part of the ZnS:Ag spectrum is filtered out.

Chromatic aberration caused by the displaying lens is also reduced.

A ninth preferred embodiment of a tube in accordance with the invention is characterized in that the luminescent material comprises a terbium-activated substantially green-luminescing phosphor having $\lambda=545$ nm, and p is a number between 1.18 and 1.22 for a $Ta_2O_5$—$SiO_2$ filter.

A tenth preferred embodiment of a tube in accordance with the invention is characterized in that the luminescent material comprises a terbium-activated blue-luminescing phosphor having $\lambda=490$, and p is a number between 1.18 and 1.22 for a $Ta_2O_5$—$SiO_2$ filter.

An eleventh preferred embodiment of a tube in accordance with the invention is characterized in that the luminescent material is europium-activated yttrium oxide ($Y_2O_3$:Eu) $\lambda=613$ nm, and p is a number between 1.18 and 1.22 for a $Ta_2O_5$—$SiO_2$ filter.

A twelfth preferred embodiment of a tube in accordance with the invention is characterized in that the luminescent material is zinc sulphide-silver (ZnS:Ag) having $\lambda=460$ nm, and p is a number between 1.21 and 1.28 for a $Ta_2O_5$—$SiO_2$ filter.

For a $Ta_2O_5$—$SiO_2$ filter the optimum p values are approximately 0.04 to 0.05 lower than for a $TiO_2$—$SiO_2$ filter. The reflection band in this case is less wide.

A thirteenth preferred embodiment of a display tube in accordance with the invention is characterized in that the outermost approximately 0.25 $\lambda_f$-thick layer of the filter which faces the luminescent material consists of a material having a high refractive index and is covered with a terminating layer having an optical thickness of approximately 0.125 $\lambda_f$ of a material having a low refractive index, on which terminating layer the luminescent material is provided.

A fourteenth preferred embodiment of a display tube in accordance with the invention is characterized in that the outermost approximately 0.25 $\lambda_f$ thick layer of the filter facing the display window consists of a material having a high refractive index and is covered with an intermediate layer having an optical thickness of approximately 0.125 $\lambda_f$ of a material having a lower refractive index.

By providing a terminating layer and/or intermediate layer having an optical thickness of approximately 0.125 $\lambda_f$ on the phosphor side and/or the display window side, respectively, the transmission in the forward direction for light rays which enclose small angles to the normal is increased, the oscillations in the transmissions are reduced, and the transmission characteristic becomes flatter.

A fifteenth preferred embodiment of a display tube in accordance with the invention is characterized in that the outermost approximately 0.25 $\lambda_f$ thick layer of the filter facing the luminescent material is composed of a mixture of metal oxide, said mixture comprising titanium oxide ($TiO_2$) and a metal oxide from the group consisting of beryllium oxide (BeO), magnesium oxide (MgO) and calcium oxide (CaO), in which mixture the quantity of titanium oxide is 70 to 90% by weight.

By using such an extra smooth, less porous layer on the phosphor side of the filter, the optical contact with the phosphor is reduced so that the gain in contrast and luminous efficiency are further increased.

Tubes according to the invention are preferably coupled optically via liquid to a system of lenses or are provided with liquid cooling in which a curved cover glass is provided on its outside surface with an anti-reflection layer. Said cover glass may also serve as the first lens element (the so-called "field-flattener").

Display tubes according to the invention can advantageously be used in projection television devices. The very bright picture transmitted in the forward direction is received substantially without losses by a system of lenses having a limited acceptance angle of, for example, 25°–30°. As a result, a brighter picture with more contrast and an improved colour rendition is obtained.

BRIEF DESCRIPTION OF THE DRAWINGS

The invention will now be described in greater detail, by way of example, with reference to a drawing, in which

FIG. 2a is a sectional view of the curved display window, filter and screen;

FIG. 2b is a partial sectional view of a portion of the window, filter and screen;

FIG. 5 shows the transmission T as a function of the angle $\alpha$ with respect to the normal for light rays through a filter as shown in FIG. 3 for a display tube according to the invention;

DESCRIPTION OF THE PREFERRED EMBODIMENTS

Figure 1:
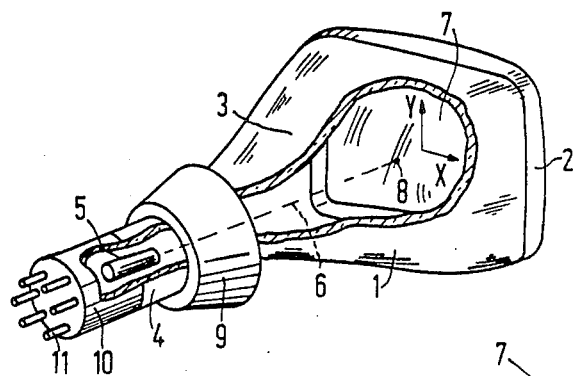
FIG. 1 is a perspective view of a projection television display tube partly broken away to show an inwardly curved display window.

FIG. 1 is a perspective view partly broken away of a projection television display tube according to the invention. The tube comprises a glass envelope 1 which consists of an inwardly curved display window 2, a cone 3, and a neck 4, and in said neck an electron gun 5 for generating an electron beam 6. Said electron beam is focused on a curved display screen 7 to form a spot 8. The display screen 7 is provided on the inside of the display window 2. The electron beam is deflected over the display screen 7 in two mutually perpendicular directions x, y by means of the system of deflection coils 9. The tube has a base 10 with connection pins 11.

FIG. 2a is a partial sectional view of the curved display window 2, the multilayer interference filter 12, and the curved display screen 7. As seen in the more detailed FIG. 2b, the display screen 7 consists of a layer of luminescent material (phosphor) 13 and a thin aluminum film 14 (the so-called "aluminum backing"). The display window has an angle of curvature $\phi$ and is preferably spherical, having a radius of curvature $\phi$.

Figure 3:
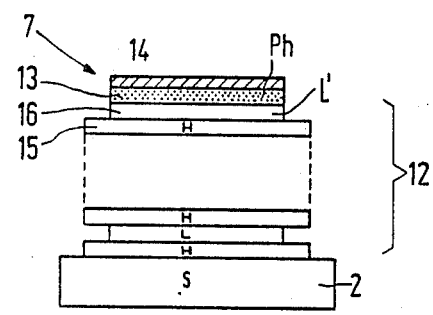
FIG. 3 shows diagrammatically the composition of a filter as used in a display tube according to the invention.

FIG. 3 shows diagrammatically a 20-layer filter 12 between a display screen 7, consisting of a layer of phosphor 13 (Ph) and an aluminum film 14, and the display window 2 (S). While said diagrammatic representation is flat, the filter in the tube is actually curved like the display window and the display screen. The filter consists of layers of $SiO_2$ indicated by the letters L and L' (refractive index n = 1.47), and layers of $TiO_2$ (n = 2.35) indicated by a letter H. The layers have a thickness of approximately 0.25 $\lambda_f$. The last approximately 0.25 $\lambda_f$ thick layer 15 on the side of the display screen 7 is covered by an approximately 0.125 $\lambda_f$ thick terminating layer 16 (L').

The phosphor 13 is a Tb-activated phosphor with $\lambda = 545$ nm. At p = 1.22, $\lambda_f$ becomes equal to 665 nm. The composition of the filter with this $\lambda_f$ is indicated in the following table.

| Layer No. | n | n.d/$\lambda_f$ |
|---|---|---|
| phosphor | | |
| 1 | L | 0.131 |
| 2 | H | 0.260 |
| 3 | L | 0.257 |
| 4 | H | 0.254 |
| 5 | L | 0.251 |
| 6 | H | 0.249 |
| 7 | L | 0.247 |
| 8 | H | 0.246 |
| 9 | L | 0.245 |
| 10 | H | 0.245 |
| 11 | L | 0.244 |
| 12 | H | 0.245 |
| 13 | L | 0.245 |
| 14 | H | 0.246 |
| 15 | L | 0.247 |
| 16 | H | 0.249 |
| 17 | L | 0.251 |
| 18 | H | 0.254 |
| 19 | L | 0.257 |
| 20 | H | 0.260 |
| display window | 1.57 | |

Figure 4:
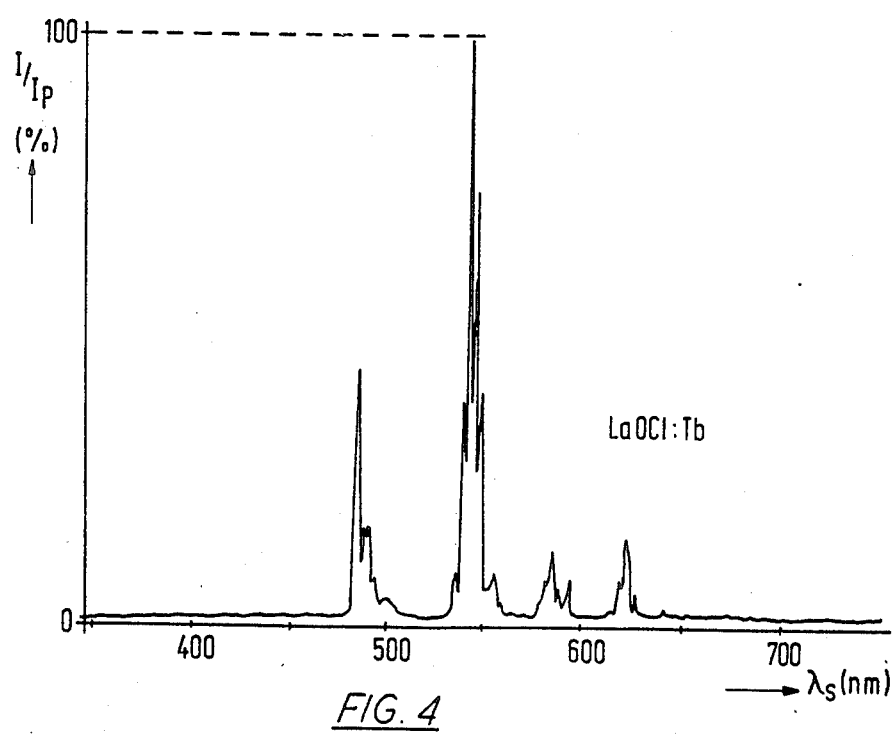
FIG. 4 shows an emission spectrum of LaOCl:Tb.

FIG. 4 shows the spectrum (the intensity standardized at the highest peak ($I_p$) in % as a function of $\lambda_s$) of lanthanumoxychlorideterbium. This spectrum is representative of all green terbium phosphors, such as:
yttrium-aluminium garnet-terbium (YAG:Tb);
yttrium-silicate-terbium ($Y_2SiO_5$:Tb);
lanthanum oxybromide-terbium (LaOBr:Tb); and
indium borate-terbium ($InBo_3$:Tb).

FIG. 5 shows the transmission T (the solid line) of the filter shown in FIG. 3 as a function of the angle $\alpha$ with respect to the normal on the filter for $\lambda = 545$ nm. The angle $\alpha$ at which the transmission of the filter has decreased to 50% (designated $\alpha 50$) is approximately 24°. For comparison, this Figure shows the transmission (the broken line) as a function of the angle $\alpha$ for the Fabry-Perot filter according to the said British Patent Specification No. 1,306,335. In order to make this filter comparable to the filter shown according to the invention, $\alpha_{50}$ for this filter has also been chosen to be 24°. Moreover, the same materials have been chosen, namely $TiO_2$ and $SiO_2$. Due to the different character of the filter, p = 0.99, hence $\lambda_f = 0.99 \times 545 = 540$ nm. A great disadvantage of this filter is the wide transmission band between 55° and 90°. All the light which is transmitted in said transmission band is lost or after reflection contributes to halo and thus gives rise to loss of contrast. This disadvantage also applies to 0.75 $\lambda_f$ and 1.25 $\lambda_f$ filters.

Figure 6:
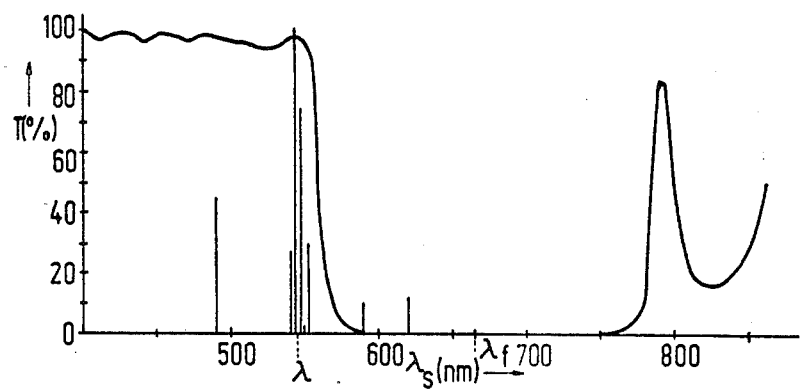
FIG. 6 shows the transmission T for perpendicularly incident light rays (0°) as a function of the spectral wavelength $\lambda_s$ for the FIG. 3 filter.

FIG. 6 shows the transmission T for light rays which are incident perpendicularly on the filter (0°) as a function of the spectral wavelength $\lambda_s$ for the FIG. 3 filter. The low-pass (short wave pass) character of the filter and also the wide reflection band between 565 and 780 nm are obvious.

Figure 7:
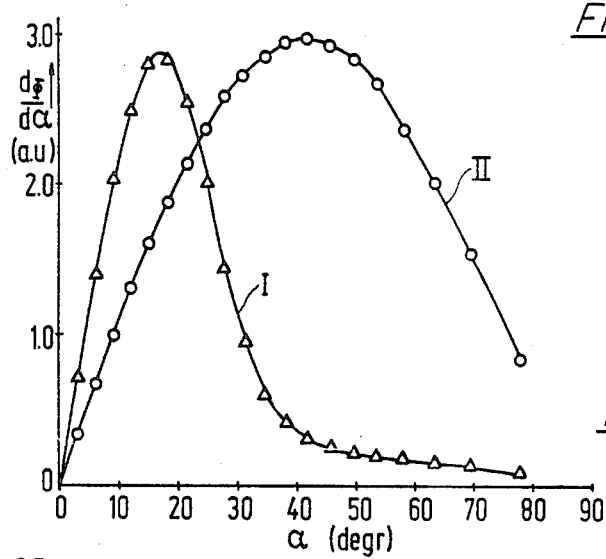
FIG. 7 shows the angular distribution of the emitted quantity of light ($d\phi/d\alpha$) as a function of the angle $\alpha$, for projection television display tubes with (I) and without a filter of the invention.

FIG. 7 shows the angular distribution of the emitted quantity of light ($d\phi/d\alpha$) in arbitrary units as a function of the angle $\alpha$ as measured at a projection television display tube having a 20-layer filter as shown in FIGS. 3, 5 and 6. For $\alpha$ smaller than 24° there is a clear gain in luminous efficiency (curve I) as compared with a projection television display tube without a filter (curve II).

Figure 8:
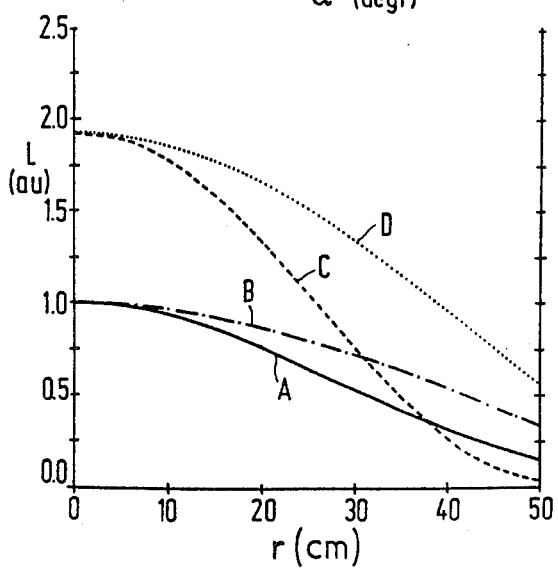
FIG. 8 shows flat and curved brightness on the projection screens for tubes with and without filters, as a function of the distance to the center.

FIG. 8 shows the brightness L (in arbitrary units) on a projection screen as a function of the distance r (in cm) from the center of the screen.
  (a) for a tube having a flat display screen without a filter (the solid line A),
  (b) for a tube having a curved display screen without a filter (the dot-and-dash line B),
  (c) for a tube having a flat display screen with filter (the dash line C), and
  (d) for the same curved display window of (b) with the same filter of (c) (the dot line D).

For the curves shown in FIG. 8, the tube of (d) has: a twenty-layer filter with (P=1.25), i.e. a transmission of 50% for an angle of 32°; an angle of curvature $\phi$=10.5° in a spherical display window; and a screen having a 127 mm diagonal and a 350 mm radius of curvature $\phi$. The projection lens associated with these tubes has a numerical aperture of the lens equal to 0.375 and a focal distance of 95 mm.

From comparison of these curves it follows that the sum of the effects as a result of curvature and filters (curve D) gives a much larger gain in the corners and at the edge of the display screen than the sum of the effects individually. As a matter of fact there is a small gain in curve B and even a loss in curve C.

Finally the table below gives a number of different embodiments and their results. Column 1 gives the type of phosphor which is used for the display screen. Column 2 shows the central wavelength of said phosphor. Column 3 gives a few values of p. Column 4 gives the value of $\alpha$ for which the transmission T=50%. Column 5 shows the number of layers of the filter used.

| Type of phosphor | $\lambda$ (nm) | p | $\alpha$ (50%) (in degrees) | number of layers filter |
|---|---|---|---|---|
| blue-Tb | 490 | 1.21 | 18 | 20 |
|  |  | 1.22 | 20 |  |
|  |  | 1.25 | 32 |  |
|  |  | 1.27 | 40 |  |
| green-Tb | 544 | 1.21 | 18 | 20 |
|  |  | 1.22 | 20 |  |
|  |  | 1.25 | 32 |  |
|  |  | 1.27 | 40 |  |
| Y$_2$O$_3$:Eu | 612 | 1.21 | 18 | 20 |
|  |  | 1.22 | 20 |  |
|  |  | 1.25 | 32 |  |
|  |  | 1.27 | 40 |  |
| Willemite | 528 | 1.30 | 48 | 14 |
| Y$_2$O$_3$:Eu | 612 | 1.25 | 31 | 14 |

Upon vapour-depositing interference filters on particular strongly curved display windows, a small thickness variation may occur in which the layers become slightly thinner towards the corners and the edge of the display screen. This variation in thickness, and the variation in p and $\lambda_f$ values, however, always falls within the range claimed in this Application. Such a small thickness variation may even have a favourable effect on the light decline towards the corners and the edge of the display screen.

What is claimed is:

1. A projection television display tube comprising in an evacuated envelope a display screen on the inside of a display window in the wall of the envelope, said display screen comprising a layer of a luminescent material and a multilayer interference filter between said luminescent material layer and the display window, the filter comprising a number of layers alternately having a high refractive index and a low refractive index, characterized in that the inside of the display window is substantially convex having an angle of curvature $\phi$, wherein $\phi$ is the angle between the axis normal to the center of the display screen and a line normal to the part of the display screen farthest remote from the center, and wherein $\phi$ is between 5° and 25°, and further characterized in that the filter is composed of at least 6 layers each having an optical thickness nd, wherein n is the refractive index of the material of the layer, and d is the thickness of the layer, said optical thickness being between 0.2 $\lambda_f$ and 0.3 $\lambda_f$, wherein $\lambda_f$ is equal to p x $\lambda$, where $\lambda$ is the desired central wavelength which is selected from the spectrum transmitted by the luminescent material and p is a number between 1.18 and 1.32.

2. A display tube as claimed in claim 1, characterized in that the convex inside of the display window is substantially spherical and has a radius of curvature $\phi$ between 150 nm and 730 nm.

3. A display tube as claimed in claim 1 or 2, characterized in that the filter is composed substantially of 14 to 30 layers.

4. A display tube as claimed in claim 1 or 2, characterized in that the optical thickness nd is between 0.23 $\lambda_f$ and 0.27 $\lambda_f$.

5. A display tube as claimed in claim 1 or 2, characterized in that the layers of the filter having a high refractive index consist of titanium oxide (TiO$_2$) or tantalum oxide (Ta$_2$O$_5$) and the layers having a low refractive index consist of silicon oxide (SiO$_2$) or magnesium fluoride (MgF$_2$).

6. A display tube as claimed in claim 5, characterized in that the magnesium fluoride is provided at approximately 300° C.

7. A display tube as claimed in claim 5, characterized in that the luminescent material comprises a terbium-activated substantially green-luminescing phosphor and $\lambda$=545 nm and p is a number between 1.21 and 1.25 for a TiO$_2$—SiO$_2$ filter.

8. A display tube as claimed in claim 5, characterized in that the luminescent material comprises terbium-activated blue-luminescing phosphor and $\lambda$=490 nm and p is a number between 1.21 and 1.25 for a TiO$_2$—SiO$_2$ filter.

9. A display tube as claimed in claim 5, characterized in that the luminescent material is europium-activated yttrium oxide (Y$_2$O$_3$:Eu) and $\lambda$=612 nm and p is a number between 1.21 and 1.25 for a TiO$_2$—SiO$_2$ filter.

10. A display tube as claimed in claim 5, characterized in that the luminescent material is zinc sulphide - silver (ZnS:Ag) and $\lambda$=460 nm and p is a number between 1.24 and 1.32 for a TiO$_2$—SiO$_2$ filter.

11. A display tube as claimed in claim 5, characterized in that the luminescent material comprises a terbium-activated substantially green-luminescing phosphor and λ=545 nm and p is a number between 1.18 and 1.22 for a Ta$_2$O$_5$—SiO$_2$ filter.

12. A display tube as claimed in claim 5, characterized in that the luminescent material comprises a terbium-activated blue-luminescing phosphor and λ=490 nm and p is a number between 1.18 and 1.22 for a Ta$_2$O$_5$—SiO$_2$ filter.

13. A display tube as claimed in claim 5, characterized in that the luminescent material is europium-activated yttrium oxide (Y$_2$O$_3$:Eu) and λ=613 nm and p is a number between 1.18 and 1.22 for a Ta$_2$O$_5$—SiO$_2$ filter.

14. A display tube as claimed in claim 5, characterized in that the luminescent material is zinc sulphide-silver (ZnS:Ag) and λ=460 nm and p is a number between 1.21 and 1.28 for a Ta$_2$O$_5$—SiO$_2$ filter.

15. A display tube as claimed in claim 1, characterized in that the outermost layer of the filter which faces the luminscent material consists of a material having a high refractive index and an optical thickness of about 0.25 λ$_f$, and is covered with a terminating layer of a material having a lower refractive index and having an optical thickness of approximately 0.125 λ$_f$.

16. A display tube as claimed in claim 1, characterized in that the outermost layer of a filter facing the display window consists of a material having a high refractive index and an optical thickness of about 0.25 λ$_f$, and is covered with an intermediate layer having a lower refractive index and an optical thickness of approximately 0.125 λ$_f$.

17. A display tube as claimed in claim 5, characterized in that the outermost approximately 0.25 λ$_f$ thick layer of the filter facing the luminescent material is composed of a mixture of metal oxides, which mixture comprises titanium oxide (TiO$_2$) and a metal oxide from the group consisting of beryllium oxide (BeO), magnesium oxide (MgO) and calcium oxide (CaO), in which mixture the quantity of titanium oxide is 70–99% by weight.

* * * * *